UNITED STATES PATENT OFFICE.

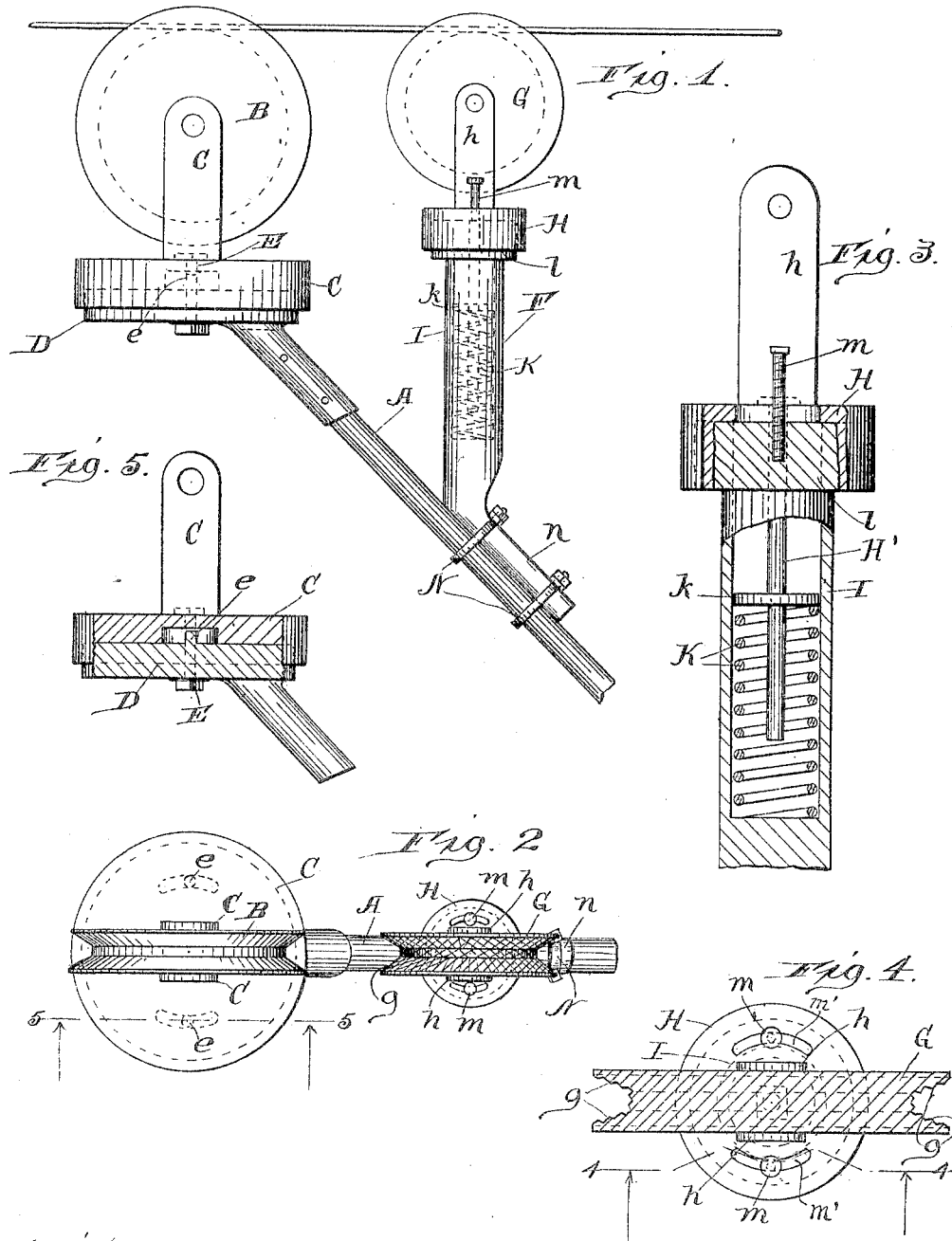

MICHAEL BAKER, OF CHICAGO, ILLINOIS.

TROLLEY.

No. 804,648.　　　　　Specification of Letters Patent.　　　　　Patented Nov. 14, 1905.

Application filed August 31, 1904. Serial No. 222,868.

*To all whom it may concern:*

Be it known that I, MICHAEL BAKER, a citizen of the United States, residing at Chicago, in the county of Cook and State of Illinois, have invented certain new and useful Improvements in Trolleys, of which the following is a specification.

My invention relates primarily to an auxiliary trolley contact-wheel, and secondarily to means for removing sleet and icy coatings from trolley-wires in advance of the main or ordinary trolley-wheel, so that the latter shall make good and continuous contact with the track or wire as it travels therealong; and in its specific form herein it consists, in the combination with a trolley-wheel having a limited free swiveling movement, of an independent ice breaking or stripping wheel or secondary contact-wheel, also swiveling freely within defined limits, and in the various other combinations and details of construction hereinafter pointed out and claimed.

In the drawings, Figure 1 is a side elevation of mechanism embodying my invention in the best form now known to me embracing so much of a trolley-pole as is necessary to an understanding of the construction and mode of operation. Fig. 2 is a top plan view of the parts shown in the foregoing figure with the wheels removed. Fig. 3 is an enlarged detail, partly in section, of the support for the ice-breaker or secondary contact-wheel. Fig. 4 is an enlarged detail, in top plan and partly in section, of said breaker and its support; and Fig. 5 is a detail in elevation, sectioned on the line 5 5 of Fig. 2, of the support for the regular trolley.

Referring now to said drawings, A represents the upper end of a trolley-pole, carrying the ordinary trolley B, mounted in trolley-harp C, the base-plate C' of which is connected to the top plate D of the pole by pivot-pin E, so as to permit the wheel a slight but free swiveling motion, limited by stops $e$ on said latter plate.

Secured to the pole so as to project in front thereof and of the trolley is a short vertical standard F, carrying at its upper end the ice-breaking pilot G, the grooved peripheral surface of which is studded or serrated, as at $g$, so as to crack and break the ice from the trolley track or wire as it travels therealong and leave a clean contact-surface for the follower or trolley-wheel proper.

In order to permit the pilot-wheel or ice-breaker to yield and to hold it up against the wire when the trolley wheel and pole are depressed by any irregularity in the track, its bearings are not in the standard itself, but in the forks $h$ of a cylindrical base-plate or cap H, to which is secured a plunger-rod H', that enters the tubular upper end or socket I of the standard and is encircled by a spring K, inclosed in said socket and pressing upward against a collar or shoulder $k$, secured to said rod, tending to lift the cap H off of the cylindrical top plate $l$ of said standand, which it embraces and upon which it turns as a pivot. This cap may be attached to the top plate by elongated bolts $m$, passing through curved slots $m'$ in one or the other, thus permitting a rising movement to the pilot-wheel under the stress of the spring, as well as a free but limited swiveling movement to the wheel, which is especially advantageous here, as it permits the wheel to swing against the ice and grind it more thoroughly. The bolts being elongated relatively to the thickness of the two bodies they connect permit sufficient vertical play under the action of the spring to compensate for the rise and fall of the trolley-wheel as it follows the track and the consequent changes in angle of the pole, but prevent the plunger-rod from flying out of the socket.

In order that the standard and ice-breaker may be detached when no longer needed, the lower bent end or foot $n$ of the standard is secured to the pole by suitable means readily removable—for instance, by the clamping yokes or straps N herein shown. These have the advantage that they do not weaken the pole as bolts would do.

It will be observed that the free swiveling movement of the trolley-wheel proper and of the secondary contact or ice-breaking wheel is limited by stops which confine the play to an area in which neither wheel will be liable to miss connection in passing over the switching-frog, but which permits self-adjusting play to all reasonable extent. It will also be observed that the free swiveling movement of these wheels between stops resisted only by friction enables them to be adjusted by hand upon pulling down the trolley-pole after jumping the track to suit a change in direction of the track or adjust to a switch, while they will be in position to be immediately restored if there is no such change or switch adjustment necessary.

It will be evident that the pilot-wheel forms a secondary contact auxiliary to the main trolley, imperfect or intermittent, it is true, so long as it is breaking ice, but fairly perfect when traveling over an uncoated reach of the track.

Having thus described my invention, I desire it to be understood that it is in no wise limited to the specific construction and arrangement herein shown and described, since many variations may be introduced without departing from the principle thereof, but

What I claim, and desire to secure by Letters Patent, is—

1. The combination with a trolley-wheel having a limited free swiveling movement, of an independent ice breaking or stripping wheel swiveling freely within defined limits.

2. The combination with a trolley-wheel swiveling freely within defined limits, of an independent secondary contact-wheel also swiveling freely within defined limits.

3. The combination with an ice breaking or stripping pilot-wheel having a limited free swiveling movement, of a trolley-wheel also swiveling freely within defined limits.

4. The combination with a trolley-wheel swiveling freely within defined limits, and its pole, of a vertical standard detachably secured to the upper end of said pole, and an auxiliary contact-wheel spring-seated in said standard and having a limited free swiveling movement thereon.

5. The combination with a trolley-wheel swiveling freely within defined limits, and its pole, of a vertical standard rising from the front of said pole and provided with a socket at its upper end, an upwardly-pressing coiled spring seated within the socket, a forked plunger or trolley-harp seated upon the spring and playing vertically in the socket, and having a limited free swiveling movement therein, and an ice-breaking pilot-wheel journaled in the forks of the plunger.

6. The combination with a trolley-wheel swiveling freely within defined limits, and its pole, of a vertical standard rising from the front of said pole and provided with a cylindrical socket at its upper end, an upwardly-pressing coiled spring seated within the socket, a forked freely-swiveling plunger seated upon the spring and playing in the socket, bolts whereby both the vertical and the swiveling play of the plunger are limited, and an ice-breaking wheel journaled in the forks of the plunger.

MICHAEL BAKER.

Witnesses:
 JOSEPH G. PARKINSON,
 JAMES STURROR.